(12) United States Patent
Hasegawa et al.

(10) Patent No.: US 7,656,373 B2
(45) Date of Patent: Feb. 2, 2010

(54) LIQUID CRYSTAL DISPLAY AND METHOD OF MANUFACTURING THE SAME

(75) Inventors: Rei Hasegawa, Yokohama (JP); Yuko Kizu, Yokohama (JP); Akira Kinno, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 653 days.

(21) Appl. No.: 11/277,096

(22) Filed: Mar. 21, 2006

(65) Prior Publication Data

US 2007/0001962 A1 Jan. 4, 2007

(30) Foreign Application Priority Data

Jul. 1, 2005 (JP) .............................. 2005-193984

(51) Int. Cl.
G09G 3/36 (2006.01)
(52) U.S. Cl. .............................. 345/87; 349/33; 349/86; 349/117
(58) Field of Classification Search .................. 349/43, 349/187–192, 33, 75, 84, 86–91, 117–121, 349/32, 167, 177; 345/87, 100
See application file for complete search history.

(56) References Cited

U.S. PATENT DOCUMENTS

| | | | | |
|---|---|---|---|---|
| 5,679,414 | A * | 10/1997 | Akashi et al. | 428/1.53 |
| 6,522,379 | B1 * | 2/2003 | Ishihara et al. | 349/139 |
| 6,542,211 | B1 * | 4/2003 | Okada et al. | 349/130 |
| 6,593,987 | B1 * | 7/2003 | Walton et al. | 349/129 |
| 6,853,435 | B2 * | 2/2005 | Tanaka et al. | 349/177 |
| 7,084,944 | B2 * | 8/2006 | Ito et al. | 349/117 |
| 2002/0149551 | A1 * | 10/2002 | Yamakita et al. | 345/87 |
| 2003/0067579 | A1 * | 4/2003 | Inoue et al. | 349/187 |

(Continued)

FOREIGN PATENT DOCUMENTS

JP 8-152609 6/1996

(Continued)

OTHER PUBLICATIONS

U.S. Appl. No. 11/689,068, filed Mar. 21, 2007, Hasegawa, et al.

(Continued)

Primary Examiner—Amare Mengistu
Assistant Examiner—Dmitriy Bolotin
(74) Attorney, Agent, or Firm—Oblon, Spivak, McClelland, Maier & Neustadt, L.L.P.

(57) ABSTRACT

A liquid crystal display includes an array substrate which includes scanning lines, signal lines, pixel circuits each including a pixel switch and a pixel electrode, a first circuit switching a state of the scanning lines between a first state that they are electrically connected to one another and a second state that they are electrically disconnected from one another, and a second circuit switching a state of the signal lines between a third state that they are electrically connected to one another and a fourth state that they are electrically disconnected from one another, a counter substrate which includes a counter electrode, and a liquid crystal layer which is interposed between the array and counter substrates and contains a high-molecular weight material and a low-molecular weight liquid crystal material, the low-molecular weight liquid crystal material forming a bend configuration before energizing the display.

19 Claims, 7 Drawing Sheets

U.S. PATENT DOCUMENTS

| | | | |
|---|---|---|---|
| 2003/0112384 A1* | 6/2003 | Tanaka et al. | 349/43 |
| 2004/0263719 A1* | 12/2004 | Inoue et al. | 349/93 |
| 2005/0024556 A1* | 2/2005 | Nakahata et al. | 349/93 |
| 2005/0030445 A1* | 2/2005 | Inoue et al. | 349/93 |

FOREIGN PATENT DOCUMENTS

| | | |
|---|---|---|
| JP | 2001-290153 | 10/2001 |
| JP | 2002-169160 | 6/2002 |
| JP | 2003-177425 | 6/2003 |

OTHER PUBLICATIONS

T. Konno, et al., "S23-2 OCB-Cell Using Polymer Stabilized Bend Alignment", Proceedings of the 15th International Display Research Conference (Asia Display '95), 1995, pp. 581-583.

* cited by examiner

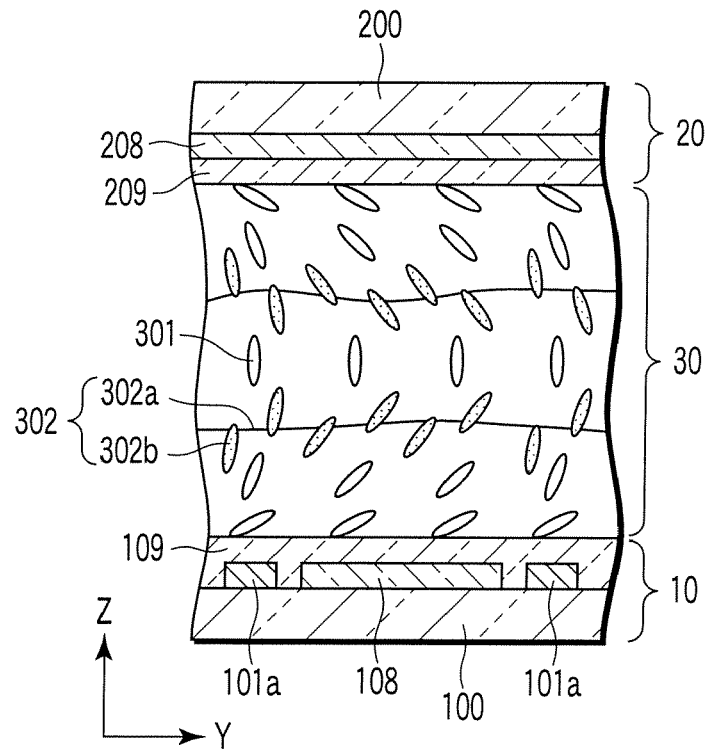
F I G. 4
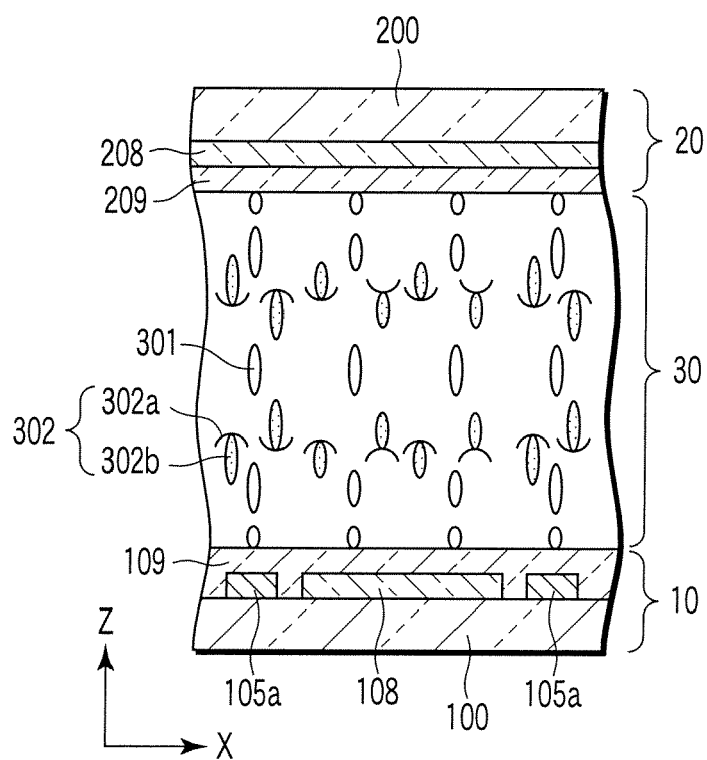
F I G. 5

LIQUID CRYSTAL DISPLAY AND METHOD OF MANUFACTURING THE SAME

CROSS-REFERENCE TO RELATED APPLICATIONS

This application is based upon and claims the benefit of priority from prior Japanese Patent Application No. 2005-193984, filed Jul. 1, 2005, the entire contents of which are incorporated herein by reference.

BACKGROUND OF THE INVENTION

1. Field of the Invention

The present invention relates to an active matrix liquid crystal display in which a liquid crystal material forms bend configuration, and a method of manufacturing the same.

2. Description of the Related Art

A π cell mode and an optically compensated bend (OCB) mode are liquid crystal display modes capable of realizing a wide viewing angle and a high response speed. When an image is displayed on a liquid crystal display employing one of these display modes, the tilt angle of liquid crystal molecules near the back and front electrodes is changed while bend configuration is maintained. An image is displayed by using a retardation change of a liquid crystal layer caused by this tilt angle change.

Liquid crystal displays employing the π cell mode or OCB mode, however, have a disadvantage that a configurational transition of a liquid crystal material from splay configuration to bend configuration is necessary every time energizing the displays, and this initial transition process requires applying a voltage of a few volts or more between the back and front electrodes for from a few seconds to a few minutes. Such an initial transition process hinders applications of the n cell mode and OCB mode.

A technique which makes the initial transition process unnecessary is described by T. Konno et al. in "OCB-Cell Using Polymer Stabilized Bend Alignment", ASIA DISPLAY '95, pp. 581-583. More specifically, a transition from splay configuration to bend configuration is caused by applying the initialization voltage to a nematic-phase mixture of an ultraviolet curing monomer and liquid crystal material. In this state, a polymer network is formed by irradiating the mixture with ultraviolet light.

In a liquid crystal cell obtained by this method, the liquid crystal material forms twisted configuration before energizing. At a certain voltage or more, the optical characteristics of twisted configuration and bend configuration are substantially equal, and a transition from twisted configuration to bend configuration is very fast. Accordingly, this liquid crystal cell requires no initial transition process.

Many liquid crystal displays which are required to have high image quality, however, use the active matrix driving method. When achieving the present invention, the present inventors have found that active matrix liquid crystal displays using the technique of T. Konno et al. readily cause display unevenness.

BRIEF SUMMARY OF THE INVENTION

According to a first aspect of the present invention, there is provided a liquid crystal display comprising an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, a first alignment layer covering the pixel electrode, a first circuit switching a state of the scanning lines between a first state that the scanning lines are electrically connected to one another and a second state that the scanning lines are electrically disconnected from one another, and a second circuit switching a state of the signal lines between a third state that the signal lines are electrically connected to one another and a fourth state that the signal lines are electrically disconnected from one another, a counter substrate which comprises a counter electrode facing the first alignment layer, and a second alignment layer covering the counter electrode, and a liquid crystal layer which is interposed between the array and counter substrates, and contains a high-molecular weight material and a low-molecular weight liquid crystal material with a molecular weight lower than that of the high-molecular weight material, the low-molecular weight liquid crystal material forming a bend configuration before energizing the display.

According to a second aspect of the present invention, there is provided a liquid crystal display comprising an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, and a first alignment layer covering the pixel electrode and subjected to an alignment treatment, a counter substrate which comprises a counter electrode facing the first alignment layer, and a second alignment layer covering the counter electrode and subjected to an alignment treatment in a direction equal to a direction of the alignment treatment on the first alignment layer, and a liquid crystal layer which is formed by preparing a fluid layer interposed between the array and counter substrates and containing a low-molecular weight liquid crystal material and a precursor of a high-molecular weight material, and polymerizing the precursor in a state that the scanning lines are electrically connected to one another and the signal lines are electrically connected to one another while alternating a voltage of the scanning lines between a voltage $V_{g,off}$ which makes the pixel switch open and a voltage $V_{g,on}$ which makes the pixel switch close and while controlling a voltage $V_{com}$ of the counter electrode, a voltage $V_{sig,off}$ of the signal lines in a period that the voltage $V_{g,off}$ is applied to the scanning lines, and a voltage $V_{sig,on}$ of the signal lines in a period that the voltage $V_{g,on}$ is applied to the scanning lines such that the voltages $V_{com}$, $V_{sig,off}$ and $V_{sig,on}$ satisfy a relationship represented by following inequalities (1) to (3).

According to a third aspect of the present invention, there is provided a method of manufacturing a liquid crystal display, comprising fabricating a liquid crystal cell comprising an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, and a first alignment layer covering the pixel electrode and subjected to an alignment treatment, a counter substrate which comprises a counter electrode facing the first alignment layer, and a second alignment layer covering the counter electrode and subjected to an alignment treatment in a direction equal to a direction of the alignment treatment on the first alignment layer, and a fluid layer which is interposed between the array and counter substrates and contains a low-molecular weight liquid crystal material and a precursor of a high-molecular weight material, and polymerizing the precursor in a state that the scanning lines are electrically connected to one another and the signal lines are electrically connected to one another while alternating a voltage of the scanning lines between a voltage $V_{g,off}$ which makes the pixel switch open and a voltage $V_{g,on}$ which makes the pixel switch close and while controlling a voltage $V_{com}$ of the counter electrode, a voltage $V_{sig,off}$ of the signal lines in a period that the voltage $V_{g,off}$ is applied to the scanning lines, and a voltage $V_{sig,on}$ of the signal lines in a period that the voltage $V_{g,on}$ is applied to the scanning lines such that the voltages $V_{com}$, $V_{sig,off}$, and $V_{sig,on}$ satisfy a relationship represented by following inequalities (1) to (3).

$$|V_{g,on} - V_{com}| > |V_{sig,on} - V_{com}| \quad (1)$$

$$|V_{g,off} - V_{com}| > |V_{sig,on} - V_{com}| \quad (2)$$

$$|V_{sig,off} - V_{com}| > |V_{sig,on} - V_{com}| \quad (3)$$

BRIEF DESCRIPTION OF THE SEVERAL VIEWS OF THE DRAWING

FIGS. 4 and 5 are partial sectional views each schematically showing a configuration of a liquid crystal material before energization;

DETAILED DESCRIPTION OF THE INVENTION

Figure 1:
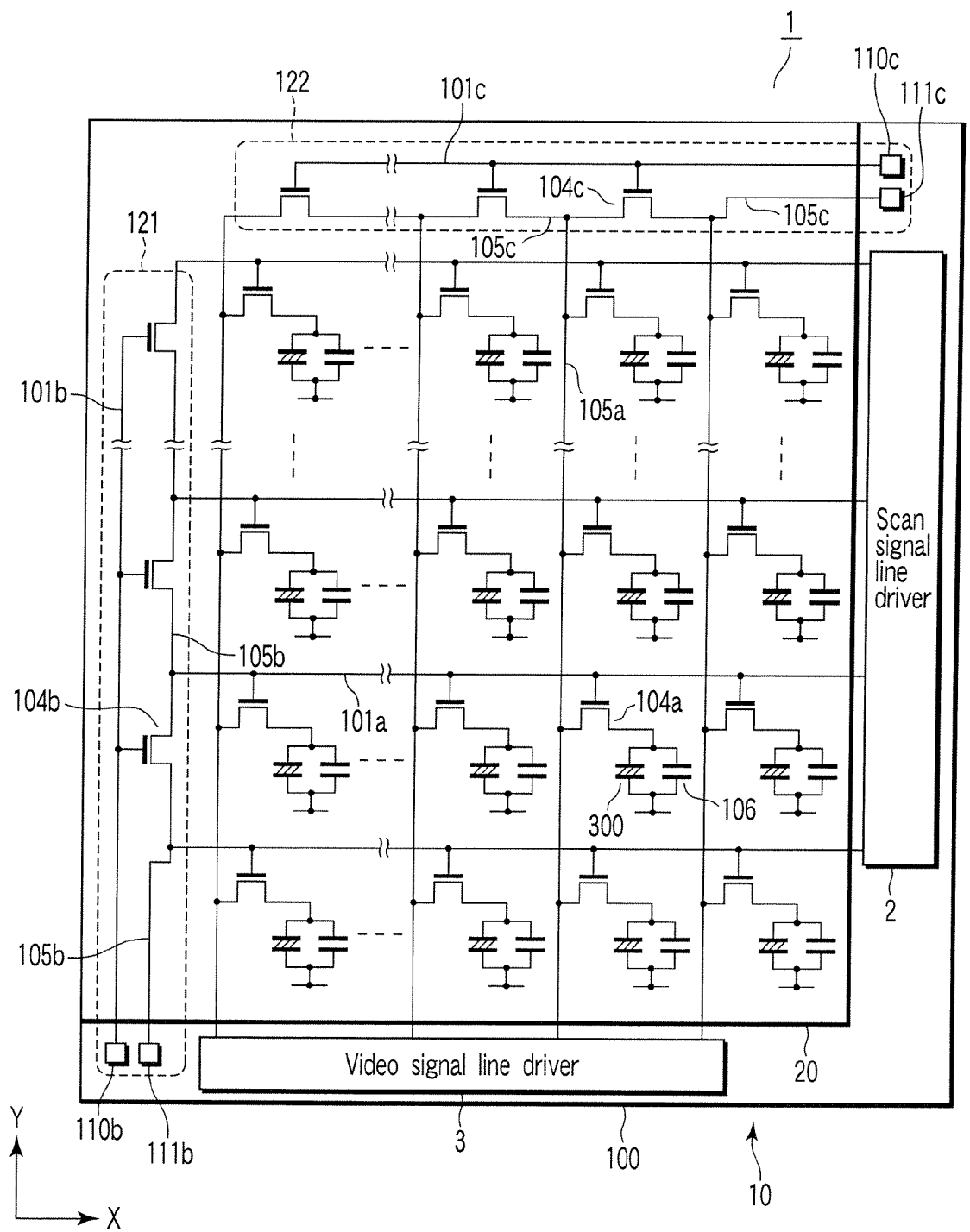
FIG. 1 is a plan view schematically showing a liquid crystal display according to an embodiment of the present invention.

An embodiment of the present invention will be described below with reference to the accompanying drawing. Note that the same reference numerals denote components which achieve the same or similar functions in the drawing, and a repetitive explanation thereof will be omitted.

Figure 2:
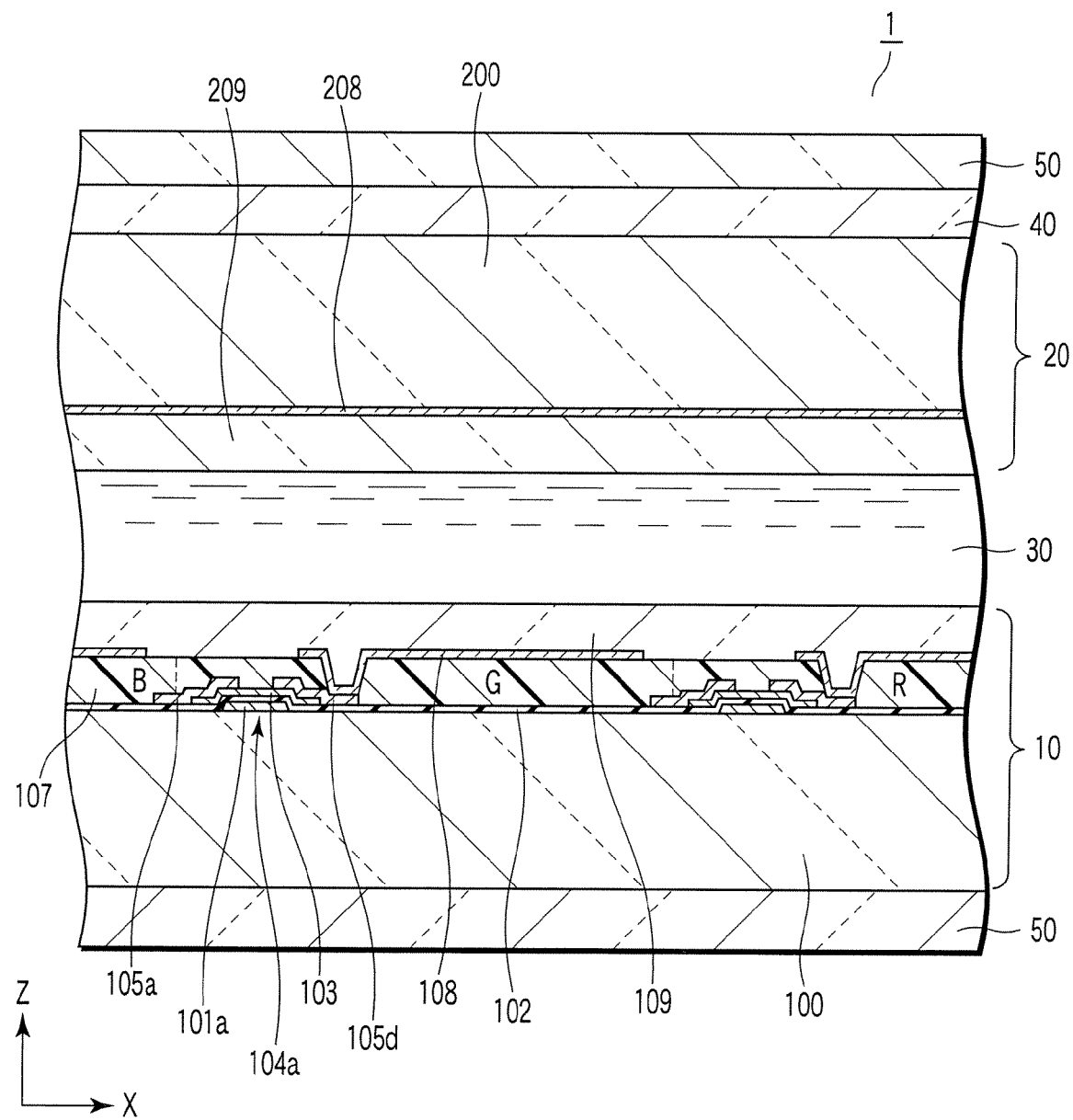
FIG. 2 is a partial sectional view schematically showing an example of a structure usable in the liquid crystal display shown in FIG. 1.

FIG. 1 is a plan view schematically showing a liquid crystal display according to the embodiment of the present invention. FIG. 2 is a partial sectional view schematically showing an example of a structure usable in the liquid crystal display shown in FIG. 1.

The liquid crystal display shown in FIGS. 1 and 2 is an OCB-mode active matrix liquid crystal display. The liquid crystal display includes a liquid crystal display panel 1, a backlight (not shown) which faces the liquid crystal display panel 1, and a scanning line driver 2 and signal line driver 3 connected to the liquid crystal display panel 1.

The liquid crystal display panel 1 includes an array substrate 10 and counter substrate 20. A frame-shaped sealing layer (not shown) is interposed between the array substrate 10 and counter substrate 20. A space surrounded by the array substrate 10, counter substrate 20, and sealing layer is filled with a mixture containing a high-molecular material and a low-molecular liquid crystal material having a molecular weight lower than that of the high-molecular material. This mixture forms a liquid crystal layer 30. A polarizer 50 is placed on the outer surface of the array substrate 10, and an optical compensation film 40 and polarizer 50 are sequentially arranged on the outer surface of the counter substrate 20.

The array substrate 10 includes a transparent substrate 100 such as a glass substrate.

On the substrate 100, scanning lines 101a, reference lines (not shown), a line 101b, and a line 101c are arranged. The scanning lines 101a and reference lines run in the X-direction, and are alternately arranged in the Y-direction crossing the X-direction. The line 101b runs in the Y-direction at a position spaced apart from the array formed by the scanning lines 101a and reference lines. The line 101c runs in the X-direction at a position spaced apart from the array formed by the scanning lines 101a and reference lines. Each of the scanning lines 101a, line 101b, and line 101c includes projections which project in the X-direction or Y-direction. These projections are used as the gate electrodes of thin-film transistors (to be described later).

The scanning lines 101a, reference lines, and lines 101b and 101c can be formed simultaneously. As the material of these lines, it is possible to use, e.g., a metal or alloy.

The scanning lines 101a, reference lines, and lines 101b and 101c are covered with an insulating film 102. As the insulating film 102, a silicon oxide film or the like can be used.

On the insulating film 102, semiconductor layers 103 are arranged correspondently with the gate electrodes. The semiconductor layers 103 intersect the gate electrodes. The semiconductor layers 103 are made of, e.g., amorphous silicon.

The gate electrodes, the semiconductor layers 103, and those portions of the insulating film 102, which are positioned between the gate electrodes and semiconductor layers 103, i.e., gate insulators, form thin-film transistors. These thin-film transistors are used as pixel switches 104a, first switches 104b, and second switches 104c.

Note that in this embodiment, the switches 104a to 104c are n-channel thin-film transistors. Note also that a channel protection layer and ohmic layer (neither is shown) are formed on each semiconductor layer 103.

On the insulating film 102, signal lines 105a, a line 105b, a line 105c, and source electrodes 105d are arranged.

The signal lines 105a run in the Y-direction, and are arranged in the X-direction correspondently with the columns formed by the pixel switches 104a. The signal lines 105a cover the drains of the semiconductor layers 103 included in the pixel switches 104a. That is, a portion of each signal line 105a is a drain electrode connected to the pixel switch 104a.

The line 105b includes a plurality of conductive portions. These conductive portions are connected to the scanning lines 101a via through holes formed in the insulating film 102. These conductive portions are also connected to the sources and/or drains of the switches 104b.

The line 105c includes a plurality of conductive portions. These conductive portions are connected to the signal lines 105a. These conductive portions are also connected to the sources and/or drains of the switches 104c.

The source electrodes 105d are arranged correspondently with the pixel switches 104a. The source electrodes 105d cover the sources of the switches 104a, and face the reference lines. The source electrodes 105d, the reference lines, and the insulating film 102 interposed between them form capacitors 106.

A color filter 107 is also placed on the insulating film 102. The color filter 107 includes coloring layers of, e.g., blue, green, and red.

Pixel electrodes 108 are arranged on the color filter 107. The pixel electrodes 108 are connected to the source electrodes 105d via through holes formed in the color filter 107. Indium tin oxide (ITO) or the like can be used as the material of the pixel electrodes 108.

The pixel electrodes 108 are covered with an alignment layer 109. The alignment layer 109 orients nearby liquid crystal molecules at a relatively large pretilt angle of, e.g., 5 to 10°. The alignment layer 109 is obtained by performing an alignment treatment process such as rubbing on an organic film made of, e.g., acryl, polyimide, nylon, polyamide, polycarbonate, benzocyclobutene polymer, polyacrylonitrile, or polysilane. Alternatively, deposition of silicon oxide or the like by oblique evaporation may be performed in order to obtain the alignment layer 109. Of these materials, polyimide, polyacrylnitrile, and nylon are superior in the ease of film formation and the chemical stability. In this embodiment, a polyimide film rubbed along the Y-direction is used as the alignment layer 109.

On the insulating film 102, scan signal input terminals (not shown), video signal input terminals (not shown), control signal input terminals 110b and 110c, and initialization signal input terminals 111b and 111c are further arranged. In this embodiment, the video signal input terminals, control signal input terminal 110b, and initialization signal input terminal 111b are arranged along one side of the substrate 100. Along a side intersecting the side described above, the scan signal input terminals, control signal input terminal 110c, and initialization signal input terminal 111c are arranged.

The scan signal input terminals and video signal input terminals are connected to the scanning lines 101a and signal lines 105a, respectively. The control signal input terminals 110b and 110c are connected to the lines 101b and 101c, respectively. The initialization signal input terminals 111b and 111c are connected to the lines 105b and 105c, respectively. As the material of these terminals, it is possible to use, e.g., a metal or alloy.

Note that the switches 104b, lines 101b and 105b, and terminals 110b and 111b form an initialization circuit 121, and the switches 104c, lines 101c and 105c, and terminals 110c and 111c form an initialization circuit 122. Note also that the pixel switches 104a, source electrodes 105d, pixel electrodes 108, and capacitors 106 form pixel circuits.

The counter substrate 20 includes a transparent substrate 200 such as a glass substrate.

A counter electrode 208 is formed on the transparent substrate 200. The counter electrode 208 is a common electrode facing the pixel electrodes 108. ITO or the like can be used as the material of the counter electrode 208.

The counter electrode 208 is covered with an alignment layer 209. A film similar to the alignment layer 109 can be used as the alignment layer 209. In this embodiment, a polyimide film which is rubbed in the same direction as the alignment layer 109 is used as the alignment layer 209.

The array substrate 10 and counter substrate 20 oppose the alignment layers 109 and 209 to each other. A frame-shaped sealing layer (not shown) is interposed between the array substrate 10 and counter substrate 20. The scan signal input terminals, video signal input terminals, control signal input terminals 110b and 110c, and initialization signal input terminals 111b and 111c are positioned outside the frame formed by the sealing layer. The sealing layer adheres the array substrate 10 and counter substrate 20. An adhesive can be used as the material of the sealing layer.

A transfer electrode (not shown) is formed between the array substrate 10 and counter substrate 20 and outside the frame formed by the sealing layer. This transfer electrode electrically connects the counter electrode 208 to the array substrate 10.

Granular spacers are interposed between the array substrate 10 and counter substrate 20, or the array substrate 10 and/or the counter substrate 20 further includes columnar spacers. These spacers form a gap having a substantially constant thickness at positions corresponding to the pixel electrodes 108 between the array substrate 10 and counter substrate 20.

A space surrounded by the array substrate 10, counter substrate 20, and sealing layer is filled with a mixture containing a high-molecular material and a low-molecular liquid crystal material having a molecular weight lower than that of the high-molecular material. This mixture forms the liquid crystal layer 30.

The high-molecular material has an average molecular weight of 10,000 or more. Note that the average molecular weight herein mentioned is the number-average molecular weight measured by gel permeation chromatography. The high-molecular material forms a polymer matrix or polymer network in the liquid crystal layer 30.

The low-molecular material has a molecular weight of 1,000 or less. This low-molecular liquid crystal material is, e.g., a nematic liquid crystal material having positive dielectric anisotropy. The low-molecular liquid crystal material forms bend configuration in the liquid crystal layer 30 before energizing the display.

The pixel electrodes 108, counter electrode 208, alignment layers 109 and 209, and liquid crystal layer 30 form liquid crystal elements 300. Each pixel includes the pixel switch 104a, liquid crystal element 300, and capacitor 106. Also, the array substrate 10, the counter substrate 20, and the liquid crystal layer 30 and sealing layer interposed between these substrates form a liquid crystal cell.

The optical compensation film 40 is, e.g., a biaxial film. As the optical compensation film 40, it is possible to use a film including an optical anisotropic layer in which a uniaxial compound having negative refractive anisotropy, e.g., a discotic liquid crystal compound forms bend configuration such that the optic axis of the compound changes in a plane perpendicular to the X-direction.

The retardation of the optical compensation film 40 is made substantially equal to that of, e.g., the liquid crystal layer 30 in the on state. In this case, the optical compensation film 40 is placed such that the retardation of a stacked structure of the optical compensation film 40 and liquid crystal layer 30 in the on state is substantially zero.

The polarizers 50 are so arranged that, e.g., their transmission axes are substantially perpendicular to each other. Also, the polarizers 50 are so arranged that, e.g., their transmission axes make an angle of about 45° with each of the X-direction and Y-direction.

The scanning line driver 2 and signal line driver 3 are connected to the scan signal input terminals and video signal input terminals, respectively. Although the drivers 2 and 3 are mounted by chip-on-glass (COG) in this embodiment, they may also be mounted by tape carrier package (TCP) instead.

The backlight (not shown) is placed on the back side of the liquid crystal display panel 1. The backlight illuminates the array substrate 10 from behind.

The liquid crystal display is manufactured by, e.g., the following method.

First, a liquid crystal cell in which no liquid crystal material is injected, i.e., an empty cell is prepared. Then, a mixture containing a high-molecular material precursor and low-molecular liquid crystal material is injected into this empty cell. A liquid crystal cell is obtained by sealing the injection port of the cell. Note that a photopolymerization initiator may also be added to the mixture.

Subsequently, an initialization apparatus (not shown) is used to perform an initialization process (to be explained later). After that, the optical compensation film 40 and polarizers 50 are adhered to the liquid crystal cell. In addition, the scanning line driver 2 and signal line driver 3 are mounted on the obtained structure, and the liquid crystal display panel 1 is assembled with a backlight and the like. In this manner, the liquid crystal display is completed.

In the initialization process of the liquid crystal cell, control signal output terminals of the initialization apparatus are brought into contact with the control signal input terminals 110b and 110c, and initialization signal output terminals of the apparatus are brought into contact with the initialization signal input terminals 111b and 111c. Then, control signals for closing the switches 104b and 104c are output from the control signal output terminals to the control signal input terminals 110b and 110c. That is, the scanning lines 101a are connected to one another, and the signal lines 105a are connected to one another. While this state is maintained, initialization signals are output from the initialization signal output terminals to the initialization signal input terminals 111b and 111c, and at the same time a polymerization reaction of the high-molecular material precursor is started. For example, the mixture containing the high-molecular material precursor and low-molecular liquid crystal material is irradiated with ultraviolet light. In this way, the liquid crystal layer 30 in which the low-molecular liquid crystal material forms bend configuration when no voltage is applied can be obtained.

Figure 3:
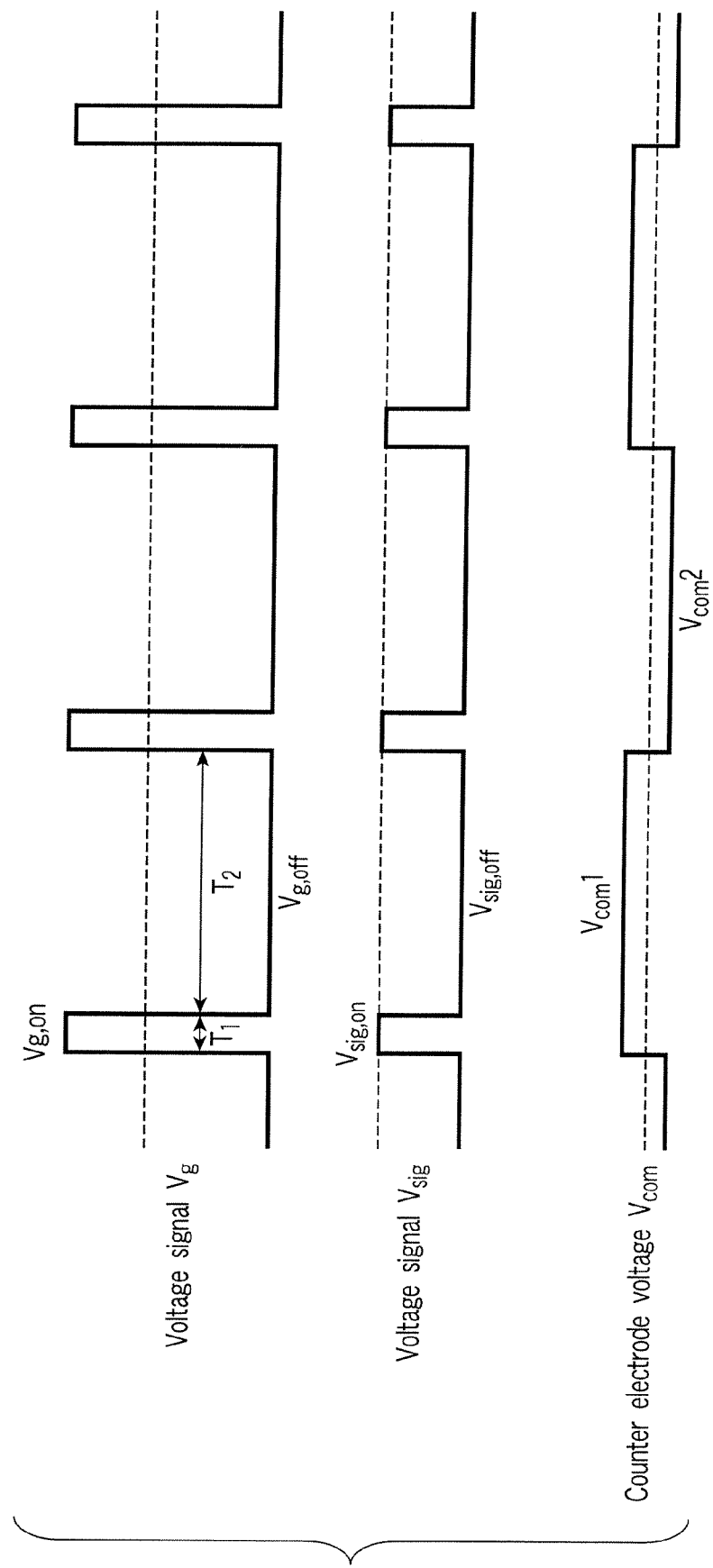
FIG. 3 is a timing chart showing an example of signals supplied to scanning lines and signal lines during an initialization process.

FIG. 3 is a timing chart showing an example of signals supplied to the scanning lines and signal lines during the initialization process. Referring to FIG. 3, the abscissa indicates time, and the ordinate indicates voltage. Also, a broken line intersecting each waveform indicates 0 V.

A waveform represented by "Voltage signal $V_g$" is the waveform of an initialization signal output from the initialization apparatus to the initialization signal input terminal 111b, i.e., the waveform of voltage applied to the scanning lines 101a. A waveform represented by "Voltage signal $V_{sig}$" indicates the waveform of an initialization signal output from the initialization apparatus to the initialization signal input terminal 111c, i.e., the waveform of voltage applied to the signal lines 105a. A waveform represented by "Counter electrode voltage $V_{com}$" indicates the waveform of voltage applied to the counter electrode 208.

In the method shown in FIG. 3, the signal supplied to the initialization signal input terminal 111b is alternately changed between voltage signals $V_{g,on}$ and $V_{g,off}$. In this embodiment as described above, the pixel switches 104a are n-channel thin-film transistors. Also, during a period in which the voltage signal $V_{g,on}$ is supplied to the initialization signal input terminal 111b, the gate-to-source voltage of each pixel switch 104a is higher than its threshold voltage. During a period in which the voltage signal $V_{g,off}$ is supplied to the initialization signal input terminal 111b, the gate-to-source voltage of each pixel switch 104a is lower than its threshold voltage. That is, the voltage signal $V_{g,on}$ is a signal which closes the pixel switches 104a, and the voltage signal $V_{g,off}$ is a signal which opens the pixel switches 104a.

During the period in which the signal $V_{g,on}$ is supplied to the initialization signal input terminal 111b, a voltage signal $V_{sig,on}$ is supplied to the initialization signal input terminal 111c. During the initialization process, therefore, the electric potential of the pixel electrode 108 is maintained at the voltage signal $V_{sig,on}$. Also, during the period in which the voltage signal $V_{g,off}$ is supplied to the initialization signal input terminal 111b, a voltage signal $V_{sig,off}$ is supplied to the initialization signal input terminal 111c. The counter electrode voltage is changed between voltages $V_{com}1$ and $V_{com}2$ whenever the signal $V_{g,on}$ is supplied to the initialization signal input terminal 111b.

In the initialization process, as indicated by inequality (1) below, during the period in which the voltage signal $V_{g,on}$ is supplied to the initialization signal input terminal 111b, an absolute value $|V_{g,on}-V_{com}|$ of the difference between the voltage $V_{g,on}$ of the scanning lines 101a and the counter electrode voltage $V_{com}$ is made larger than an absolute value $|V_{sig,on}-V_{com}|$ of the difference between the voltage $V_{sig,on}$ of the pixel electrodes 108 and the counter electrode voltage $V_{com}$. Also, as indicated by inequalities (2) and (3), during the period in which the signal $V_{g,off}$ is supplied to the initialization signal input terminal 111b, an absolute value $|V_{g,off}-V_{com}|$ of the difference between the voltage $V_{g,off}$ of the scanning lines 101a and the counter electrode voltage $V_{com}$ and an absolute value $|V_{sig,off}-V_{com}|$ of the difference between the voltage $V_{sig,off}$ of the signal lines 105a and the counter electrode voltage $V_{com}$ are made larger than the absolute value $|V_{sig,on}-V_{com}|$.

$$|V_{g,on} - V_{com}| > |V_{sig,on} - V_{com}| \quad (1)$$

$$|V_{g,off} - V_{com}| > |V_{sig,on} - V_{com}| \quad (2)$$

$$|V_{sig,off} - V_{com}| > |V_{sig,on} - V_{com}| \quad (3)$$

That is, in this initialization process, the voltages of all the pixel electrodes 108 are made equal to one another, those of all the scanning lines 101a are made equal to one another, and those of all the signal lines 105a are made equal to one another. Also, in this initialization process, during the period in which the signal $V_{g,on}$ is supplied to the initialization signal input terminal 111b, the absolute value of the voltage between the scanning lines 101a and counter electrode 208 is made larger than the absolute value of the voltage between the pixel electrodes 108 and counter electrode 208. In addition, during the period in which the signal $V_{g,off}$ is supplied to the initialization signal input terminal 111b, both the absolute value of the voltage between the scanning lines 101a and counter electrode 208 and the absolute value of the voltage between the signal lines 105a and counter electrode 208 are made larger than the absolute value of the voltage between the pixel electrodes 108 and counter electrode 208. Consequently, a liquid crystal display which requires no initial transition process and hardly causes display unevenness is obtained.

Note that if the initialization process described above is performed by the same method as above except that the scanning lines 101a are driven in a line sequential manner, the in-plane uniformity of liquid crystal configuration sometimes becomes insufficient. In this case, therefore, display unevenness may occur.

Also, during the initialization process, if the absolute value of the voltage between the scanning lines 101a and counter electrode 208 and/or the absolute value of the voltage between the signal lines 105a and counter electrode 208 is smaller than that of the voltage between the pixel electrodes 108 and counter electrode 208, the liquid crystal material sometimes forms splay configuration in regions between the scanning lines 101a and counter electrode 208 or in regions between the signal lines 105a and counter electrode 208. If this liquid crystal display is used for long time periods or used at high temperatures, the splay configuration may extend to a portion of the region between the pixel electrodes 108 and counter electrode 208, and this may cause display unevenness.

The initialization process can be performed even when the circuits 121 and 122 are omitted. For example, probe rows or anisotropic conductive sheets are used as the initialization signal output terminals of the initialization apparatus, and brought into contact with the scan signal input terminal and video signal input terminal of the array substrate 10. However, it is difficult to bring the probe rows or anisotropic conductive sheets into contact with the scanning lines 101a or signal lines 105a without any defects, because the number of these lines is typically several hundreds or more. If a contact defect occurs, the in-plane uniformity of liquid crystal configuration may become insufficient to cause display unevenness.

In the initialization process, the ratio of the left side to the right side of inequality (1) is, e.g., 2 to 10. The ratio of the left side to the right side of inequality (2) is, e.g., 2 to 10. The ratio of the left side to the right side of inequality (3) is, e.g., 2 to 10. If these ratios are low, the liquid crystal material readily forms splay configuration in the region between the scanning lines 101a and counter electrode 208 or in the region between the signal lines 105a and counter electrode 208. If these ratios are high, liquid crystal molecules sometimes form homeotropic configuration in the region between the scanning lines 101a and counter electrode 208 or in the region between the signal lines 105a and counter electrode 208. This may make the bend configuration between the pixel electrodes 108 and counter electrode 208 unstable.

In the initialization process, a ratio $T_1/T_2$ of time $T_1$ during which the signal $V_{g,on}$ is supplied to the initialization signal input terminal 111b to time $T_2$ during which the signal $V_{g,off}$ is supplied to the initialization signal input terminal 111b is, e.g., 1/2000 to 1/3. If the ratio $T_1/T_2$ is high, the liquid crystal material readily forms splay configuration in the region between the signal lines 105a and counter electrode 208. If the ratio $T_1/T_2$ is low, the initialization voltage $V_{sig,on}$ cannot be well written in the pixel electrodes via the pixel switches 104a in some cases, i.e., the voltage applied to the pixel electrodes and the initialization voltage $V_{sig,on}$ are sometimes not equal.

Although it depends on intensity of the radiated ultraviolet rays, the time from the start to the end of the initialization process is, e.g., 3 seconds or more. If this processing time is short, the polymerization reaction of the high-molecular material precursor does not well progress to make stabilization of bend configuration impossible in some cases.

In this manufacturing method, a liquid crystal acrylate monomer such as a liquid crystalline monofunctional acrylate monomer (an acrylate monomer having one acrylic double bond in a molecule) can be used as the high-molecular material precursor. As the acrylate monomer, it is possible to use, e.g., compounds indicated by formulas (1) to (3) below.

(1)

(2)

(3)

The high-molecular material contained in the liquid crystal layer 30 is, e.g., a side-chain high-molecular liquid crystal material in which rigid mesogen groups bond as side chains directly or indirectly to a high-molecular skeleton. As this side-chain high-molecular liquid crystal material, it is possible to use, e.g., polymers indicated by formulas (4) to (6).

(4)

(5)

-continued

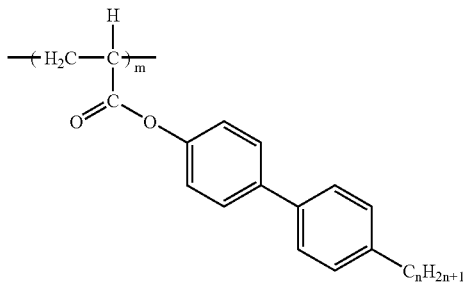

(6)

The weight ratio of the low-molecular liquid crystal material to the high-molecular liquid crystal material contained in the liquid crystal layer 30 is, e.g., 49:1 to 10:1. If the content of the low-molecular liquid crystal material is small, it is sometimes necessary to increase the thickness of the liquid crystal layer 30 in order to realize a high contrast ratio. If the content of the low-molecular liquid crystal material is large, the liquid crystal material readily forms splay configuration when no voltage is applied.

The liquid crystal display has the characteristic that the retardation of the liquid crystal layer 30 when no voltage is applied is smaller in the region between the scanning line 101a and counter electrode 208 and in the region between the signal line 105a and counter electrode 208 than in the region between the pixel electrode 108 and counter electrode 208. Typically, the retardation difference between these regions is about 50 nm to about 200 nm. This will be explained below with reference to FIGS. 4 and 5.

FIGS. 4 and 5 are partial sectional views each schematically showing the configuration of the liquid crystal material before energization. Note that FIGS. 4 and 5 illustrate the liquid crystal cell included in the liquid crystal display of FIG. 1 in a simplified manner.

In FIGS. 4 and 5, reference numeral 301 denotes a low-molecular liquid crystal material; 302, a side-chain high-molecular liquid crystal material; 302a, a high-molecular skeleton of the side-chain high-molecular liquid crystal material 302; and 302b, a mesogen group bonded to the high-molecular skeleton 302a.

In the initialization process explained with reference to FIG. 3, the individual voltages are so controlled as to satisfy the relationships indicated by inequalities (1) to (3). That is, voltages higher than the voltage applied between the pixel electrodes 108 and counter electrode 208 are applied between the scanning lines 101a and counter electrode 208 and between the signal lines 105a and counter electrode 208. During the initialization process, therefore, the low-molecular liquid crystal material 301 forms bend configuration closer to homeotropic configuration in the region between the scanning lines 101a and counter electrode 208 and in the region between the signal lines 105a and counter electrode 208 than in the region between the pixel electrodes 108 and counter electrode 208.

In this state, the polymerization reaction of the high-molecular material precursor is started. In the liquid crystal cell after this initialization process, therefore, the side-chain high-molecular liquid crystal material 302 tends to maintain the configuration of the low-molecular liquid crystal material 301 during the initialization process. This is presumably the reason why, even before energizing the display, the low-molecular liquid crystal material 301 forms bend configuration closer to vertical configuration in the region between the scanning line 101a and counter electrode 208 and in the region between the signal line 105a and counter electrode 208 than in the region between the pixel electrode 108 and counter electrode 208.

Letting d be the thickness of the liquid crystal layer 30, $n_o$ be the ordinary index of the liquid crystal layer 30, $n_e$ ($n_e > n_o$) be the extraordinary index of the liquid crystal layer 30, and θ be the average inclination angle of the liquid crystal molecules to the substrate surface (the inclination angle θ is zero in homogeneous configuration, and 90° in homeotropic configuration), retardation R of the liquid crystal layer 30 can be represented by the following equation.

$$R = d \times (\sqrt{n_e^2 \times \cos^2\theta + n_o^2 \times \sin^2\theta} - n_o)$$

According to the equation, the larger the inclination angle θ, the smaller the retardation R. Also, as described above, this liquid crystal display has the characteristic that the retardation R of the liquid crystal layer 30 before energization is smaller in the region between the scanning lines 101a and counter electrode 208 and in the region between the signal lines 105a and counter electrode 208 than in the region between the pixel electrodes 108 and counter electrode 208. This is also probably the reason why, even before energizing the display, the low-molecular liquid crystal material 301 forms bend configuration closer to homeotropic configuration in the region between the scanning lines 101a and counter electrode 208 and in the region between the signal lines 105a and counter electrode 208 than in the region between the pixel electrodes 108 and counter electrode 208.

As described above, the liquid crystal display according to this embodiment includes the liquid crystal layer 30 in which, even before energizing the display, the low-molecular liquid crystal material forms bend configuration in the first regions between the pixel electrodes 108 and counter electrode 208, and, in the second regions between the scanning lines 101a and counter electrode 208 and the third regions between the signal lines 105a and counter electrode 208, the low-molecular liquid crystal material forms bend configuration and the retardation is smaller than that in the first regions.

Note that the retardation of the liquid crystal layer 30 before energization can be checked by retardation measurement using, e.g., the Senarmont method for the liquid crystal cell. Also, the retardation measurement uses light having a wavelength of about 550 nm.

FIGS. 4 and 5 each illustrate, as an example, the straight-chain high-molecular skeleton 302a which extends in a direction substantially parallel to the Y-direction. However, the high-molecular skeleton 302a can extend in any direction. In addition, the high-molecular skeleton 302a can take any conformation. Furthermore, the high-molecular skeleton 302a can branch. For example, the high-molecular skeleton 302a can have a two-dimensional network structure or three-dimensional network structure.

Various modifications of this liquid crystal display are possible.

Figure 6:
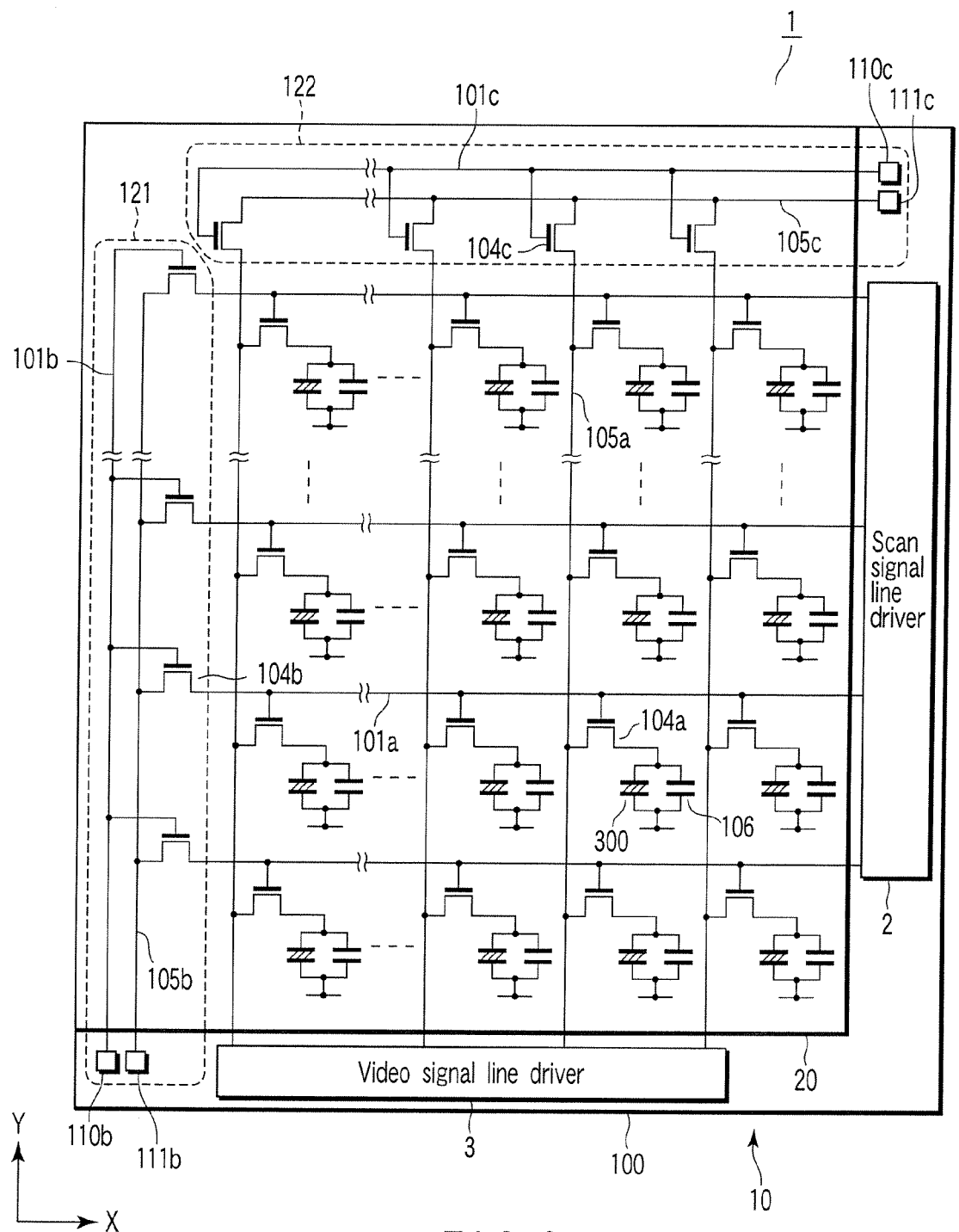
FIG. 6 is a plan view schematically showing a liquid crystal display according to a modification.

FIG. 6 is a plan view schematically showing a liquid crystal display according to a modification. This liquid crystal display has the same structure as the liquid crystal display shown in FIGS. 1 and 2 except that the following arrangements are employed in the initialization circuits 121 and 122.

That is, in the liquid crystal display shown in FIG. 6, switches 104b are arranged in one-to-one correspondence with scanning lines 101a, and switches 104c are arranged in one-to-one correspondence with signal lines 105a. The switches 104b are connected between the scanning lines 101a and a terminal 111b, and the switches 104c are connected between the signal lines 105a and a terminal 111c.

In the liquid crystal display shown in FIG. 1, the lines 105b and 105c do not intersect any other line. In the liquid crystal display shown in FIG. 6, however, lines 105b and 105c intersect other lines. Shortcircuits readily occur in the intersections of lines. When this is taken into consideration, therefore, the structure shown in FIG. 1 is more advantageous than that shown in FIG. 6.

Also, in the liquid crystal display shown in FIG. 1, the scanning lines 101a on the side of the signal line driver 3 are connected to the terminal 111b without the switches 104b interposed between them, and the signal lines 105a on the side of the scanning line driver 2 are connected to the terminal 111c without the switches 104c interposed between them. On the other hand, in the liquid crystal display shown in FIG. 6, all the scanning lines 101a are connected to the terminal 111b via the switches 104b, and all the signal lines 105a are connected to the terminal 111c via the switches 104c. Accordingly, when an electrostatic damage or the like is taken into consideration, the structure shown in FIG. 6 is more advantageous than that shown in FIG. 1.

Figure 7:
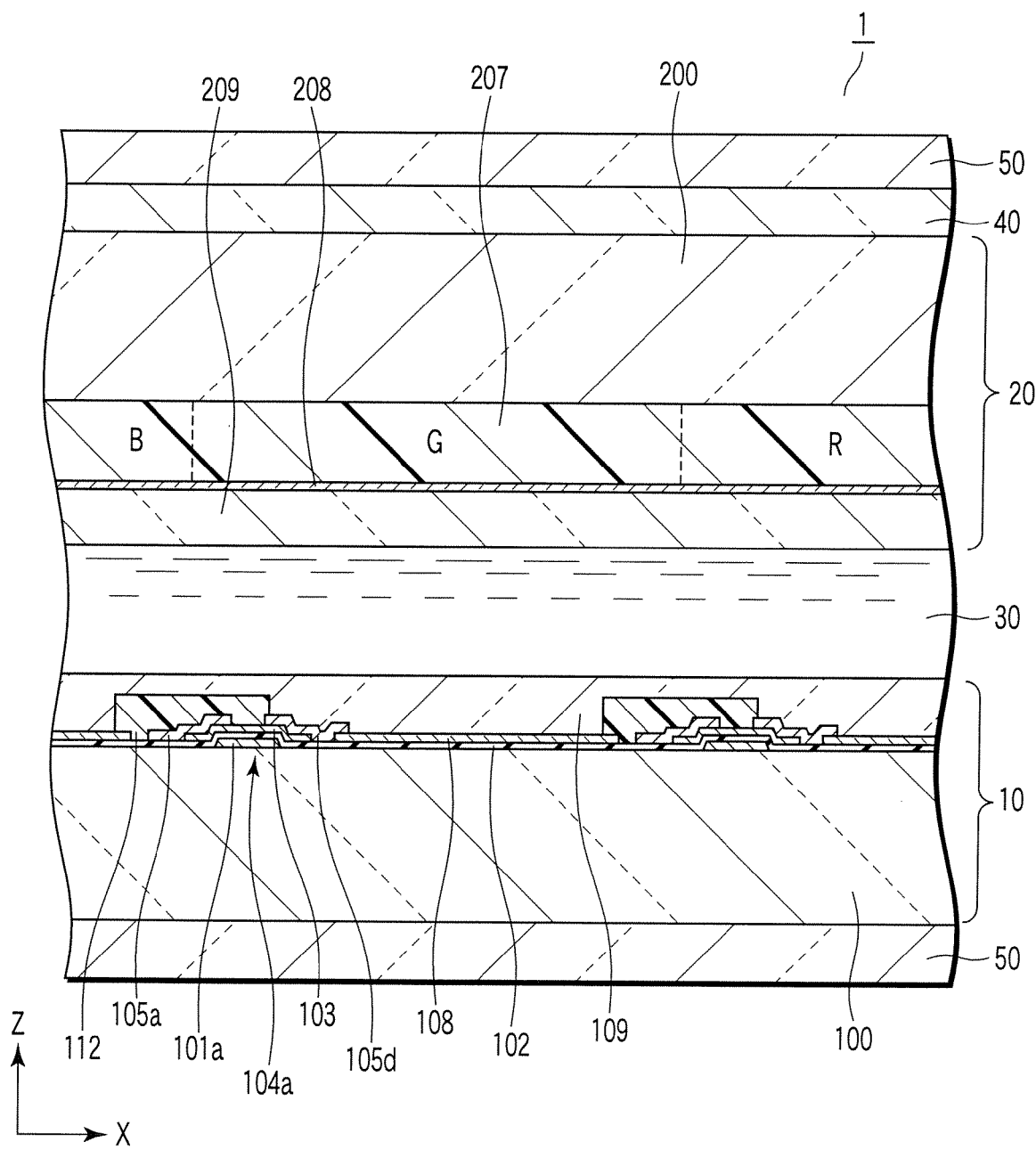
FIG. 7 is a partial sectional view schematically showing a liquid crystal display according to another modification.

FIG. 7 is a partial sectional view schematically showing a liquid crystal display according to another modification. This liquid crystal display has the same structure as the liquid crystal display shown in FIGS. 1 and 2 except that the following structures are employed in the array substrate 10 and counter substrate 20.

That is, in the liquid crystal display shown in FIG. 7, the color filter 107 is omitted from the array substrate 10, and a color filter 207 is placed between the substrate 200 of the counter substrate 20 and the counter electrode 208 instead. Also, in the liquid crystal display shown in FIG. 7, a black matrix 112 is placed between the signal lines 105a and alignment layer 109. In this manner, it is also possible to use a color filter on array structure and a black matrix on array structure.

In the liquid crystal display shown in FIG. 7, a planarizing layer may also be formed between the color filter 207 and counter electrode 208. When this planarizing layer is formed, the flatness of the counter electrode 208 increases. Therefore, the order parameter of the liquid crystal increases, and any undesired shortcircuits between members of the array substrate 10 and the counter electrode 208 do not easily occur.

As the material of the planarizing layer, it is possible to use an organic material such as acryl, polyimide, nylon, polyamide, polycarbonate, benzocyclobutene polymer, polyacrylonitrile, or polysilane. Of these materials, acryl is superior in cost, a benzocyclobutene polymer is superior in flatness, and polyimide is superior in chemical stability.

In the above liquid crystal displays, amorphous silicon thin-film transistors are used as the switches 104a to 104c. However, polysilicon thin-film transistors may also be used. In addition, other switching elements such as thin-film diodes may also be used as the switches 104a to 104c instead of thin-film transistors.

Examples of the present invention will be described below.

EXAMPLE 1

In this example, the liquid crystal display shown in FIG. 1 was manufactured by the following method. Note that in this embodiment, substantially the same structures as shown in FIG. 7 were used as an array substrate 10 and counter substrate 20.

In the manufacture of the array substrate 10, scanning lines 101a, reference lines (not shown), and lines 101c and 101b were first formed on a glass substrate 100. Chromium was used as the material of these lines.

Then, these lines were covered with an insulating film 102 having a layered structure including a chromium oxide film and silicon oxide film. A semiconductor layer 103 made of amorphous silicon was formed on the insulating film 102, and patterned. After that, channel protection layers (not shown) made of silicon nitride were formed on the semiconductor layers 103, and ohmic layers (not shown) were formed on the semiconductor layers 103 and channel protection layers.

On the insulating film 102, signal lines 105a, lines 105b and 105c, source electrodes 105d, scan signal input terminals (not shown), video signal input terminals (not shown), control signal input terminals 110b and 110c, and initialization signal input terminals 111b and 111c were formed. In addition, pixel electrodes 108 were formed on the insulating film 102.

In the manufacture of the counter substrate 20, a chromium film was first formed on a glass substrate 200 and patterned, thereby obtaining a black matrix. Subsequently, a striped color filter 207 was formed on this black matrix by using a photosensitive acrylic resin in which red, green, and blue pigments were added.

Then, the color filter 207 was coated with a transparent acrylic resin to form a planarizing layer or overcoat (not shown). After that, ITO was sputtered on the planarizing layer to form a counter electrode 208. In addition, columnar spacers (not shown) having a height of 5 µm and bottom surface dimensions of 5 µm ×10 µm were formed on the counter electrode 208 by using photolithography. These columnar spacers were so formed as to be positioned on the signal lines 105a when the array substrate 10 and counter substrate 20 were adhered.

The pixel electrodes 108 and counter electrode 208 were cleaned, and coated with a polyimide solution (SE-5291 manufactured by Nissan Chemical Industries) by offset printing. A hotplate was used to heat these coating films at 90° C. for 1 minute, and then at 200° C. for 30 minutes. In this manner, alignment layers 109 and 209 were formed.

The alignment layers 109 and 209 were then rubbed by using cotton cloth. These rubbing processes were performed such that the rubbing directions of the alignment layers 109 and 209 were the same when the array substrate 10 and counter substrate 20 were adhered. Also, each rubbing was done by using cotton rubbing cloth whose fibers have a diameter of 0.1 to 10 µm at there tips, under the conditions that the rotational speed of the rubbing roller was 500 rpm, the substrate moving velocity was 20 mm/s, the pushing depth was 0.7 mm, and the number of times of rubbing was 1. After the rubbing, the alignment layers 109 and 209 were cleaned with an aqueous solution containing a neutral surfactant as its main component.

After that, the major surface of the counter substrate 20 was coated with an epoxy adhesive as the material of a sealing layer by using a dispenser so as to surround the alignment layer 209. Note that the frame formed by the adhesive layer was provided with an opening to be used as an injection port later. Subsequently, the array substrate 10 and counter substrate 20 were aligned such that the alignment layers 109 and 209 faced each other and their rubbing directions were equal. After this alignment, the array substrate 10 and counter substrate 20 were adhered and heated to 160° C. under pressure, thereby curing the adhesive.

Then, the empty cell thus obtained was loaded into a vacuum chamber, and evacuated. After that, a mixture of a low-molecular liquid crystal material, high-molecular material precursor, and photopolymerization initiator was injected into the cell from the injection port. As the low-molecular liquid crystal material, E7 (manufactured by Merck, Japan) as a nematic liquid crystal composition was used, and the concentration of this material in the mixture was set at 95 wt %. As the high-molecular material precursor, UCL-001 (manufactured by Dainippon Ink and Chemicals) as a liquid crystalline monofunctional acrylate monomer was used, and the concentration of this material in the mixture was set at 4.95 wt %. As the photopolymerization initiator, 2,2-dimethoxy-2-phenylacetophenone was used, and the concentration of this material in the mixture was set at 0.05 wt %.

After the injection port was sealed with an epoxy adhesive, control signal output terminals of an initialization apparatus were brought into contact with the control signal input terminals 110b and 110c, and initialization signal output terminals of the apparatus were brought into contact with the initialization signal input terminals 111b and 111c. Then, control signals for closing the switches 104b and 104c were output from the control signal output terminals to the control signal input terminals 110b and 110c. While this state was maintained, the initialization process explained with reference to FIG. 3 was performed. That is, the initialization signals $V_g$ and $V_{sig}$ were output from the initialization signal output terminals to the initialization signal input terminals 111b and 111c, and the voltage $V_{com}$ was applied to the counter electrode 208. At the same time, the liquid crystal cell was irradiated with ultraviolet light.

In this example, the voltage $V_{g,on}$ was +20 V, the voltage $V_{g,off}$ was −30 V, the voltage $V_{sig,on}$ was 0 V, the voltage $V_{sig,off}$ was −20 V, the voltage $V_{com}1$ was +5 V, and the voltage $V_{com}2$ was −5 V. The time $T_1$ (the pulse width of the signals $V_g$ and $V_{sig}$) was 0.1 ms, and the frequency of the signals $V_g$ and $V_{sig}$ was 30 Hz. The liquid crystal cell was irradiated with ultraviolet light having a dominant wavelength of 365 nm and an intensity of 3.3 mW/cm$^2$, and this irradiation was continued for 3 minutes.

The liquid crystal cell obtained as described above was observed with a polarizing microscope. Consequently, before energization, the retardation of the liquid crystal layer 30 was smaller in regions between the scanning lines 101a and counter electrode 208 and in regions between the signal lines 105a and counter electrode 208 than in regions between the pixel electrodes 108 and counter electrode 208.

Then, a polarizer 50 was adhered to the outer surface of the array substrate 10, and an optical compensation film 40 and polarizer 50 were adhered to the outer surface of the counter substrate 20. This display was so designed that when a voltage of 5 V was applied between the pixel electrodes 108 and counter electrode 208, the retardation of a stacked structure of the liquid crystal layer 30 and optical compensation film 40 at positions corresponding to the pixel electrodes 108 was substantially zero. Also, the polarizers 50 were so arranged that their transmission axes were substantially perpendicular to each other, and each transmission axis made an angle of about 45° with each of the X-direction and Y-direction.

In addition, a scanning line driver 2 and signal line driver 3 were connected to the array substrate 10, and the liquid crystal display panel 1 thus obtained and a backlight were assembled. In this way, the liquid crystal display was completed.

Immediately after starting energization, this liquid crystal display was able to display images having no display unevenness. Note that the absolute value of the voltage applied between the pixel electrodes 108 and counter electrode 208 was 5 V in the on state, and zero in the off state. The front contrast ratio was 400:1, and the response time was 5 ms. The viewing angle (within which the contrast ratio was 10:1 or more, and no grayscale inversion occurred) was 70° or more in both the vertical and horizontal directions. Furthermore, this display caused no display unevenness even after a continuous operation for 3,000 hrs at a temperature of any of 0° C., 25° C., and 50° C.

EXAMPLE 2

A liquid crystal cell was manufactured following the same procedures as explained in Example 1 except that a mixture of UCL-001 (an acrylate monomer having only one acrylic double bond in a molecule) as a liquid crystalline monofunctional acrylate monomer and KAYARAD HX-220 (manufactured by Nippon Kayaku) as a multifunctional acrylate monomer (an acrylate monomer having a plurality of acrylic double bonds in a molecule) having no liquid crystal properties was used as the high-molecular material precursor. As the mixture injected into the empty cell, a mixture containing 95% of liquid crystal E7, 4.7% of UCL-001, 0.25% of HX-220, and 0.05% of 2,2-dimethoxy-2-phenylacetophenone was used. When this liquid crystal cell was observed with a polarizing microscope, with no voltage being applied, the retardation of the liquid crystal layer 30 was smaller in regions between scanning lines 101a and a counter electrode 208 and in regions between signal lines 105a and the counter electrode 208 than in regions between pixel electrodes 108 and the counter electrode 208.

Then, a liquid crystal display was manufactured following the same procedures as explained in Example 1 except that the above liquid crystal cell was used. When this liquid crystal display was driven under the same conditions as in Example 1, it was possible to display images having no display unevenness immediately after starting energization. Also, the front contrast ratio was 400:1, and the response time was 5 ms. The viewing angle was 70° or more in both the vertical and horizontal directions. In addition, a continuous operating inspection was conducted on this display under the same conditions as in Example 1. As a consequence, no display unevenness occurred after the continuous operation at a temperature of any of 0° C., 25° C., and 50° C. Since the multifunctional acrylate monomer having no liquid crystal properties was added, a side-chain high-molecular liquid crystal formed by photopolymerization had a network structure. Consequently, the structure of the polymer further strengthened, and a configurational change was difficult to occur when a strong force was applied to the panel surface of the liquid crystal display.

COMPARATIVE EXAMPLE 1

In this example, a liquid crystal cell was manufactured following the same procedures as explained in Example 1 except that the initialization circuits 121 and 122 were omitted, neither a high-molecular material precursor nor a photopolymerization initiator was used, and no initialization process was performed. When this liquid crystal cell was observed with a polarizing microscope, with no voltage being applied, the retardation of a liquid crystal layer 30 in regions between scanning lines 101a and a counter electrode 208 and in regions between signal lines 105a and the counter electrode 208 was equal to that in regions between pixel electrodes 108 and the counter electrode 208.

A liquid crystal display was manufactured following the same procedures as explained in Example 1 except that the above liquid crystal cell was used. This liquid crystal display was unable to display normal images immediately after starting energization, and it took about 1 minute to display normal images after starting energization.

COMPARATIVE EXAMPLE 2

In this example, an empty cell was manufactured following the same procedures as in Example 1 except that the initialization circuits 121 and 122 were omitted. The same composition as used in Example 1 was injected into this cell, and the injection port was sealed with an epoxy adhesive.

Then, an initialization process was performed using an initialization apparatus including probe rows as initialization signal output terminals. More specifically, the probe rows were brought into contact with scan signal input terminals and video signal input terminals. Subsequently, signals shown in FIG. 8 were output to the individual probes, and the liquid crystal cell was irradiated with light.

Figure 8:
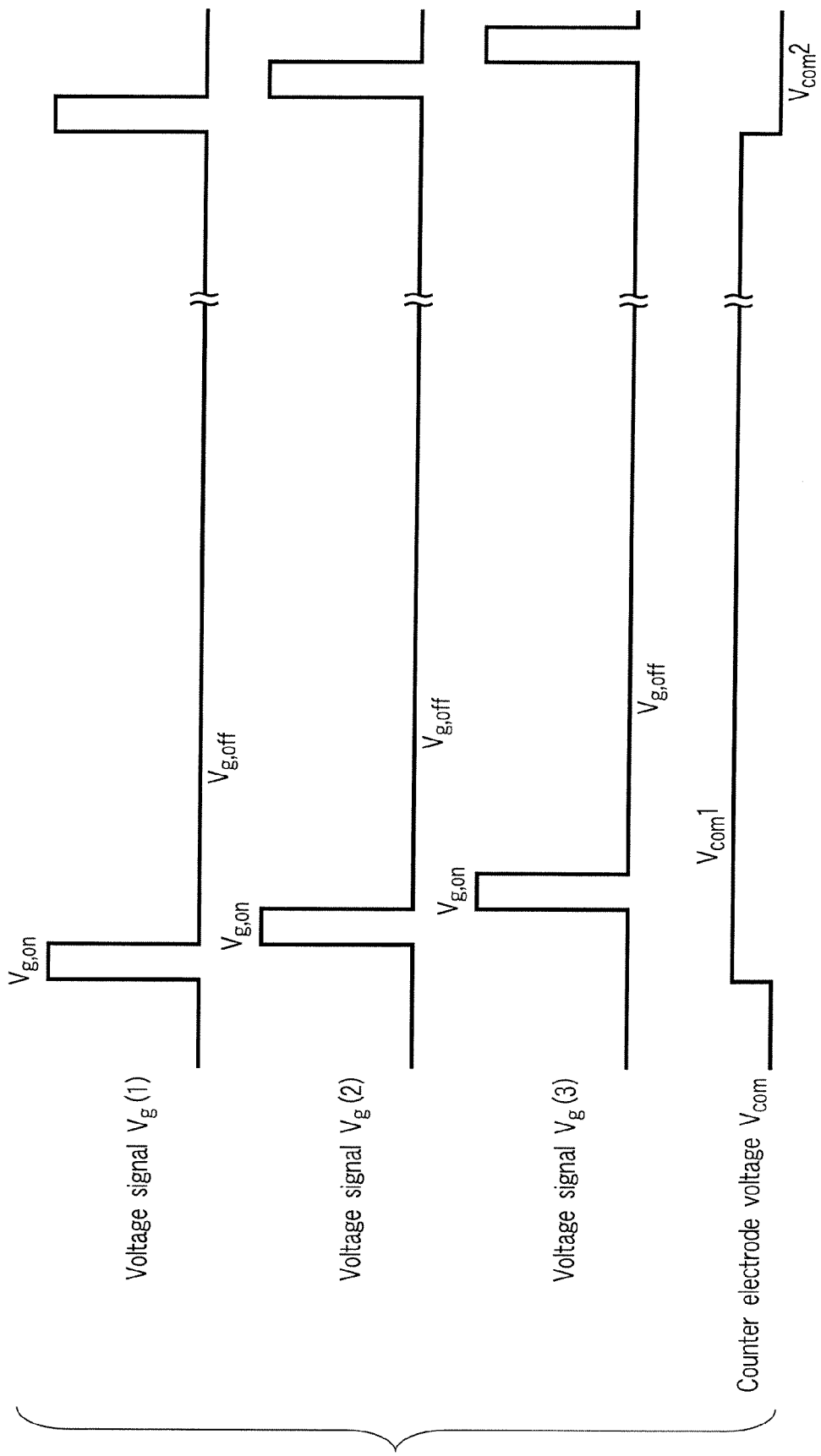
FIG. 8 is a timing chart showing signals supplied to scanning lines in an initialization process of Comparative Example 2.

FIG. 8 is a timing chart showing the signals supplied to the scanning lines in the initialization process of Comparative Example 2. Referring to FIG. 8, the abscissa indicates time, and the ordinate indicates voltage.

A waveform represented by "Voltage signal $V_g(1)$" indicates the waveform of an initialization signal output from the initialization apparatus to a first scanning line 101a. A waveform represented by "Voltage signal $V_g(2)$" indicates the waveform of an initialization signal output from the initialization apparatus to a second scanning line 101a. A waveform represented by "Voltage signal $V_g(3)$" indicates the waveform of an initialization signal output from the initialization apparatus to a third scanning line 101a. A waveform represented by "Counter electrode voltage $V_{com}$" indicates the waveform of voltage applied to a counter electrode 208.

In this initialization process as shown in FIG. 8, the scanning lines 101a were driven in a line sequential manner, and the counter electrode voltage $V_{com}$ was changed between voltages $V_{com}1$ and $V_{com}2$ for each horizontal period. During the initialization process, a constant voltage $V_{sig}$ was output to all signal lines 105a.

More specifically, the voltage $V_{g,on}$ was +20 V, the voltage $V_{g,off}$ was −30 V, the voltage $V_{sig}$ was 0 V, the voltage $V_{com}1$ was +5 V, and the voltage $V_{com}2$ was −5 V. The pulse width of the signal $V_g(m)$ was 0.1 ms, and the frequency was 30 Hz. The liquid crystal cell was irradiated with ultraviolet light having a dominant wavelength of 365 nm and an intensity of 3.3 mW/cm$^2$, and this irradiation was continued for 3 minutes.

The liquid crystal cell obtained as described above was observed with a polarizing microscope. Consequently, when no voltage was applied, the retardation of a liquid crystal layer 30 in regions between the signal lines 105a and counter electrode 208 was equal to that in regions between pixel electrodes 108 and the counter electrode 208. Also, when no voltage was applied, the retardation of the liquid crystal layer 30 in regions between the scanning lines 101a and counter electrode 208 was smaller than that in the region between the pixel electrodes 108 and counter electrode 208.

A liquid crystal display was manufactured following the same procedures as explained in Example 1 except that the above liquid crystal cell was used. When this liquid crystal display was driven under the same conditions as in Example 1, it was possible to display normal images immediately after starting energization, but the images had display unevenness. Also, the front contrast ratio was 100:1, and the response time was 5 ms. The viewing angle was 70° or more in both the vertical and horizontal directions. Furthermore, a continuous operating inspection was conducted on this display under the same conditions as in Example 1. As a consequence, the display unevenness increased as the temperature rose.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display comprising:
an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, a first alignment layer covering the pixel electrode, a first circuit switching a state of the scanning lines between a first state that the scanning lines are electrically connected to one another and a second state that the scanning lines are electrically disconnected from one another, and a second circuit switching a state of the signal lines between a third state that the signal lines are electrically connected to one another and a fourth state that the signal lines are electrically disconnected from one another;
a counter substrate which comprises a counter electrode facing the first alignment layer, and a second alignment layer covering the counter electrode; and
a liquid crystal layer which is interposed between the array and counter substrates, and contains a high-molecular weight material and a low-molecular weight liquid crystal material with a molecular weight lower than that of the high-molecular weight material, the low-molecular weight liquid crystal material forming a bend configuration before energizing the display.

2. The display according to claim 1, wherein the first circuit includes a first control signal input terminal, a first initialization signal input terminal electrically connected to one of the scanning lines, and first switches electrically connecting the scanning lines to one another, each switching operation of the first switches being controlled by a first control signal from the first control signal input terminal, and wherein the second circuit includes a second control signal input terminal, a second initialization signal input terminal electrically connected to one of the signal lines, and second switches electrically connecting the signal lines to one another, each switching operation of the second switches being controlled by a second control signal from the second control signal input terminal.

3. The display according to claim 1, wherein the first circuit includes a first control signal input terminal, a first initialization signal input terminal, and first switches electrically connecting the first initialization signal input terminal to the scanning lines, each switching operation of the first switches being controlled by a first control signal from the first control signal input terminal, and wherein the second circuit includes a second control signal input terminal, a second initialization signal input terminal, and second switches electrically connecting the second initialization signal input terminal to the signal lines, each switching operation of the second switches being controlled by a second control signal from the second control signal input terminal.

4. The display according to claim 1, wherein the high-molecular weight material includes a liquid crystal polymer.

5. The display according to claim 2, wherein the high-molecular weight material includes a liquid crystal polymer.

6. The display according to claim 3, wherein the high-molecular weight material includes a liquid crystal polymer.

7. The display according to claim 1, wherein the high-molecular weight material includes a side chain liquid crystal polymer.

8. The display according to claim 2, wherein the high-molecular weight material includes a side chain liquid crystal polymer.

9. The display according to claim 3, wherein the high-molecular weight material includes a side chain liquid crystal polymer.

10. The display according to claim 1, wherein a display mode of the display is an OCB mode.

11. A liquid crystal display comprising:
an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, and a first alignment layer covering the pixel electrode and subjected to an alignment treatment;
a counter substrate which comprises a counter electrode facing the first alignment layer, and a second alignment layer covering the counter electrode and subjected to an alignment treatment in a direction equal to a direction of the alignment treatment on the first alignment layer; and
a liquid crystal layer which is interposed between the array substrate and the counter substrate and includes a high-molecular weight material and a low-molecular weight liquid crystal material with a molecular weight lower than that of the high-molecular weight material, the low-molecular weight liquid crystal material forming a bend configuration before energizing the display, the liquid crystal layer including first to third regions, the first region being a region of the liquid crystal layer between the pixel electrodes and the counter electrode and having a first retardation for light with a wavelength of 550 nm before energizing the display, the second region being a region of the liquid crystal layer between the scanning lines and the counter electrode and having a second retardation for light with a wavelength of 550 nm before energizing the display, the third region being a region of the liquid crystal layer between the signal lines and the counter electrode and having a third retardation for light with a wavelength of 550 nm before energizing the display, and the second and third retardations being smaller than the first retardation.

12. The display according to claim 11, wherein the low-molecular weight liquid crystal material in the first region forms a first bend configuration before energizing the display, and the low-molecular weight liquid crystal material in each of the second and third regions forms a second bend configuration closer to a vertical configuration as compared with the first bend configuration before energizing the display.

13. The display according to claim 11, wherein the high-molecular weight material includes a liquid crystal polymer.

14. The display according to claim 11, wherein the high-molecular weight material includes a side chain liquid crystal polymer.

15. The display according to claim 11, wherein a display mode of the display is an OCB mode.

16. A method of manufacturing a liquid crystal display, comprising:
fabricating a liquid crystal cell comprising an array substrate which comprises scanning lines, signal lines intersecting the scanning lines, pixel circuits arranged correspondently with intersections of the scanning lines and the signal lines and each including a pixel switch whose switching operation is controlled by a scan signal from the scanning line and a pixel electrode electrically connected to the signal line via the pixel switch, and a first alignment layer covering the pixel electrode and subjected to an alignment treatment, a counter substrate which comprises a counter electrode facing the first alignment layer, and a second alignment layer covering the counter electrode and subjected to an alignment treatment in a direction equal to a direction of the alignment treatment on the first alignment layer, and a fluid layer which is interposed between the array and counter substrates and contains a low-molecular weight liquid crystal material and a precursor of a high-molecular weight material; and
polymerizing the precursor in a state that the scanning lines are electrically connected to one another and the signal lines are electrically connected to one another while alternating a voltage of the scanning lines between a voltage $V_{g,off}$ which makes the pixel switch open and a voltage $V_{g,on}$ which makes the pixel switch close and while controlling a voltage $V_{com}$ of the counter electrode, a voltage $V_{sig,off}$ of the signal lines in a period that the voltage $V_{g,off}$ is applied to the scanning lines, and a voltage $V_{sig,on}$ of the signal lines in a period that the voltage $V_{g,on}$ is applied to the scanning lines such that the voltages $V_{com}$, $V_{sig,off}$, and $V_{sig,on}$ satisfy a relationship represented by following inequalities (1) to (3), $$|V_{g,on} - V_{com}| > |V_{sig,on} - V_{com}| \qquad (1)$$

$$|V_{g,off} - V_{com}| > |V_{sig,on} - V_{com}| \qquad (2)$$

$$|V_{sig,off} - V_{com}| > |V_{sig,on} - V_{com}| \qquad (3)$$

17. The method according to claim 16, wherein polymerizing the precursor includes polymerizing the precursor to produce a liquid crystal polymer.

18. The method according to claim 16, wherein the precursor includes a liquid crystalline acrylate monomer.

19. The display according to claim 11, wherein a difference between the first and second retardations and a difference between the first and third retardations fall within a range of 50 nm to 200 mm.

* * * * *